United States Patent [19]

Pierce-Bjorklund

[11] Patent Number: 4,942,865
[45] Date of Patent: Jul. 24, 1990

[54] COMPOUND SOLAR COLLECTOR BUILDING CONSTRUCTION

[76] Inventor: Patricia Pierce-Bjorklund, P.O. Box 908, 15 Spring St., Essex, Mass. 01929

[21] Appl. No.: 208,962

[22] Filed: Jun. 20, 1988

Related U.S. Application Data

[63] Continuation-in-part of Ser. No. 81,216, Aug. 3, 1987, abandoned.

[51] Int. Cl.⁵ .............................................. E04D 13/18
[52] U.S. Cl. ...................................... 126/431; 52/281; 52/303; 52/307; 52/475
[58] Field of Search ............... 126/429, 431, 432, 449; 52/220, 281, 302, 303, 305, 307, 308, 383, 410, 475, 476, 477, 513, 235

[56] References Cited

U.S. PATENT DOCUMENTS

| | | |
|---|---|---|
| 4,164,108 | 8/1979 | Ortmanns . |
| 4,194,334 | 3/1980 | Katona ................................... 52/476 |
| 4,458,464 | 7/1984 | Borghetto ............................. 52/477 |
| 4,756,131 | 7/1988 | Stoakes ................................. 52/235 |

*Primary Examiner*—Noah P. Kamen

[57] ABSTRACT

A compound convective construction matrix having an anterior half-matrix disposed to form the first radiation receiving surfaces of the compound matrix and a posterior half-matrix disposed to form the last radiation receiving surfaces of the compound matrix, each of the said half-matrices consisting of two identical frame members arranged in a stacked relation and each frame member having inclined frame elements disposed in intersecting relation to form a grid having grid intersections forming a plurality of compartments, each compartment housing a transparent component cushioned securely therein. The two identical half-matrices are arranged in paired and opposed mirror-image relation and having opposed half-compartments cooperate to form a plurality of internal hollow chambers. The two opposed half-matrices are joined by compressive devices at grid intersections. Thermal non-conductive spacers located at each grid intersection at the neutral axis spaces the opposed matrices apart forming a series of continuous passages extending the full length and breadth of the matrix and intersecting in each chamber. The joined half-matrices form a single structural member having two distinct thermal gradients, an external gradient in the anterior half-matrix and an interior gradient in the posterior half-matrix.

11 Claims, 6 Drawing Sheets

COMPOUND SOLAR COLLECTOR BUILDING CONSTRUCTION

CROSS REFERENCE

This application is a continuation-in-part to U.S. application for Letters patent Ser. No. 07/081,216 filed 08/30/87, now abandoned and entitled; COMPOUND SOLAR COLLECTOR BUILDING CONSTRUCTION

BRIEF SUMMARY OF THE INVENTION

The present invention relates to compound building construction matrices and is a continuation-in-part to U.S. patent application Ser. No. 07/081,216. In particular it provides certain novel and useful forms of prefabricated and stacked grid members, frames, perforated plates or the like capable of forming the principal structure of a wall, roof, floor or other construction and having a thermal break at the neutral axis of the member.

The principal objects of the invention are to provide energy conservation improvements in building construction and to effect substantial savings by retaining and converting for direct use or storage the natural energy incident on a building periphery constructed with the novel matrix members. Thus much of the daily energy now incident on external surfaces of structures would be retained for use rather than reflected back into the external ambient.

These objects are accomplished by providing an improved type of building member in the form of prefabricated and stacked structural grids or the like having translucent components disposed in the hollow portions of the grid within which incident light is converted to heat or electricity for transport to storage, direct use or remote use.

The term compound matrix as used herein refers to a first set of like elements and a second set of like elements, the diverse sets of elements being the components of the matrix, wherein, the first and second sets are disposed in compound array having each set share surfaces with the second set to thereby form the total construction or building members.

The shared surfaces of both sets of elements and the non-shared surfaces of both sets together forming a novel and useful structural member and defining a plurality of internal hollow expansion chambers at intervals suitable for the conversion and harvest of solar energy. The combined sets of elements also provide the first and last external surfaces of the matrix and the first and last internal surfaces of the matrix with respect to incoming radiation.

As in the compound matrix of Ser. No. 081,216 the present novel buildings members consist of two half-matrices fabricated individually and then disposed in mirror-image relation about the neutral axis of symmetry of the member and fastened together by compressive devices passing through the neutral axis. The two half-matrices form a whole matrix.

A thermal non-conductor compressive strength spacer is disposed at the neutral axis between the two half-matrices at grid intersections as part of each compressive device, to thereby form a single structural member having a dual thermal gradient. One half of the matrix may be cool and the other half warm. The two halves may reverse roles according to changes in seasons or climate requirements.

As in Ser. No. 081,216 each half-matrix of the present application consists of novel frame elements having inclined portions disposed in intersecting relation to form a grid having a plurality of compartments between grid intersections. Each compartment housing a portion of a translucent component securely restrained therein. The half-matrices are arranged in paired and opposed mirror-image relation and fastened together, each half-compartment joining the opposed half-compartment to define a plurality of internal hollow chambers having passages between chambers. The passages are provided in the present invention by the spaced distance between frames. The spaced distance between half-matrices provides a second thermal break and convective flow through the internal hollow portions of the matrix for removal of heat or electricity developed in each chamber and in the total matrix. The total matrix may consist of many such members forming the entire building periphery, roofs and walls or portions thereof In this present compound matrix the first set of like elements in each half-matrix consists of pairs of single-grid frames that are identical in profile and which stack in relation to each other to share portions of the inclined surfaces of each frame profile The two stacked identical frames form a doubled structural section where the inclined portions engage and parallel flanges that are locked apart to house the second set of like elements which are the transparent components of the matrix In this specification two types of transparent component are shown, one being a flat glass pane housed between the parallel flanges during the stacking procedure and having a butyl or other cushioning device securely placed around its periphery between flanges. The second component being a glass half-block having inclined sidewalls and faceted outer surfaces. The inclined sidewalls match the inclination of the stacking frame elements.

In this improvement of Ser. No. 081,216 the first set of like elements are the stacking frames which share surfaces and form a doubled structural section. The second set of like elements are the transparent components which are restrained by shared inclined surfaces or restrained by flanges formed by shared surfaces. The conservation goals of the present invention are accomplished in part by the provision of compressive thermal barriers located at grid intervals along the neutral axis of symmetry between the opposed anterior and posterior portions of the matrix. The anterior portion, or anterior half-matrix, being that portion disposed to provide the first incoming radiation receiving surfaces of the matrix. The posterior portion, or posterior half-matrix being that portion disposed to provide the last radiation receiving surfaces of the matrix.

The novel frame elements proposed herein do not have the hollow triangulated profile typical of Ser. No. 081,216 which required the compressive devices to extend from one extreme outermost surface of the matrix through the neutral axis to the opposed outermost surface of the matrix. The length of the threaded bolts or other device required to extend this distance gives a distance from the neutral axis that could exert a moment, or force acting over distance, causing shear forces on the bolt heads as the matrix becomes subject to tensile and compressive stresses in its outermost portions in spanning conditions. The new profile has a bolt length that extends only the distance between compressed stacked opposed webs and the dimension of the thermal break spacing device. Since the bolts shown have a large diameter and a threaded housing of equal length there should be minimal stress exerted on bolt heads.

The thermal break devices prohibit the transmission of heat or cool waves between anterior and posterior half-matrices while allowing the transmission of structural stresses between the two. The neutral axis of the spanning matrix being the midline plane of symmetry between opposed half-matrices where tensile and compressive forces typical in members subject to bending is zero.

There are numerous frames and grids commonly used in the construction industry and many of them can be modified to accommodate convective flow components proposed in the parent application. Virtually any standard frame can be modified to permit convective flow between grid compartments.

However, to my knowledge, no standard frame modified for flow could provide the benefits of the present invention. The novel frame elements of the present invention having inclined portions which extend outwardly from a flat portion and flanges at the extreme ends of the inclined portions, stack in a relationship that can form any desired depth between flanges and between parallel flat portions according to the formula:

$$\sin a = \frac{t}{d + t}$$

where:
 d is the design depth of the space between flanges
 t is thickness of the structural material
 a is the angle of inclination of the webs from a line normal to the flat portion The ability for two (or more) single frames to stack at desired distances and having the engaged portions form a doubled structural section and a watertight barrier, makes it possible to quickly form a structural panel from two simple identical grids. The two simple grids bolt at intersections to form a half-matrix which may be used by itself when convective flow is not desirable. When two half-matrices are paired and opposed in mirror image relation and bolted together with thermal nonconductors between the two, a unique single structure having equal mass at equal distance from the neutral axis is formed, which has also a thermal break at its midline axis.

The opposed frame profiles having equal and opposite mass serve as the top and bottom flanges of an I beam where the web is replaced by the compressive threaded bolt devices. Thus a type of space frame is provided having a transparent skin integrally provided with the structure. The matrices as shown provide both structure and transparent building skin. The contractor or engineer need only provide the major I beams and columns, or standard channels and tees. The matrix provides the entire remaining structure needed to complete the building. No joists or roofing, or exterior finishing are required. The stacking shared surfaces of frame elements and butyl strips provide a watertight seal.

There is to my knowledge no comparable existing or precedent construction matrix which provides the advantages of the present invention which is both a solar collector and a translucent structural spanning member having convective flow through internal chambers and a thermal break between the opposed half-matrices.

The matrices are appropriate for use in constructing solariums, atriums, curtain walls, space frames, long span daylit sports arenas or gymnasiums, greenhouses, schools and in any industrial or commercial structure which benefits from use of natural energy incident on peripheries of the structure.

The solar collector aspects of the present invention operate on the same principles as the parent applications 081,216 and 554,046 now become 159,328. Tinted panes having metallic particles suspended in the glass melt or deposited on one of the posterior half-matrix surfaces are located in the posterior half-matrix and interspersed between them are clear panes at intervals and in sequences designed to modify the temperature of the air stream. Daylight and direct sunlight striking the posterior tinted panes is converted to heat for transfer to the convective airstream for transport to remote use, storage or direct use. Light not absorbed in the translucent absorber panes passes through the panes to become direct gain to the interior. The warming air stream also passes through entirely transparent sequences of flow as it rises and expands in multi-story applications.

Heat reflective coatings are used to advantage on the opposed internal surfaces of the matrix to keep heat in or out as desired. The tinted absorber panes used for solar collection when located in the posterior matrix may be located in the anterior matrix in hot climates where cooling needs dictate that light not enter the building in large quantity and the matrices may be used to exhaust heat developed in the internal chambers creating a lesser cooling load for artificial cooling devices. The thermal barrier devices also serve to make the solar collection or exhaust more efficient as the outer half matrix may be cool or warm according to season and the inner half matrix may stay close to desired room temperature year around. The thermal mass of each unit volume of matrix relative to the unit volumes of fluid medium is discussed in the closing paragraph of this specification and that of U.S. Ser. No. 081,216.

The stacking principle offers a further economic advantage in that one mold or tool produces multiple reproductions of the same piece which then combines with other like pieces to form each of the opposed half matrices. Also the stacking principle enjoys a profile that can be fabricated in any dimension for long or short spans for heavy duty use or for lightweight fragile structures. The compartment size can also vary according to design goals making aesthetic decisions possible according to individual preferences. The system will be identifiable from the exterior only to the extent that the frames appear to recede from view—otherwise the intervals between members and the geometry of compartments may enjoy a wide range and variety of shapes.

A further advantage of the novel frame elements in profile is the ability to incline the opposed matrices at any angle in 360° rotation while maintaining the integrity of the fragile translucent components and the structural capability of the compound member, there being no top or bottom to the member. A section taken through the compound matrix normal to the neutral axis and normal to the plane of flow reveals the same symmetry no matter what inclination the matrix is given.

The proposed half-matrices comprising the compound building member, hereinafter called a compound matrix, are made of simple frame members easily manufactured by standard die or mold casting, injection molding or standard extrusion procedures using stamping, or cutting processes to notch and match elements before welding into grid relationships. The compound matrices and the half-matrices which may be used independently to form walls and roofs, are easily handled and installed by one person using mechanical or hand hoisting devices. The edge conditions between matrices also fit easily onto standard I beam flanges or may rest on standard structural channels or Tees.

A basic principle of the invention is the combining of two identical frame members in mirror image symmetric relation. The two identical frame members each consisting of two identical grids stacked one upon the other. The two identical doubled frames or half-matrices are then arranged in paired and opposed relation having a mirror-image symmetry about the neutral axis and fastened to each other by devices exerting a compressive force on the two opposed double members. The two opposed identical half-matrices each having grid intersections of sufficient breadth to receive the compressive fastening devices and compressive discs or the like disposed between the doubled frames or other means to prevent crushing of the metal, aluminum materials when compressive forces are exerted.

A further basic principle of the invention is the stacking aspect of the two frames forming each half-matrix. The stacking principle offers any desired thickness (t) of frame according to spanning requirements and any desired depth (d) for the space needed to restrain transparent or other components in grid compartments according to the formula $$\sin a = \frac{t}{d + t}.$$

Figure 9:
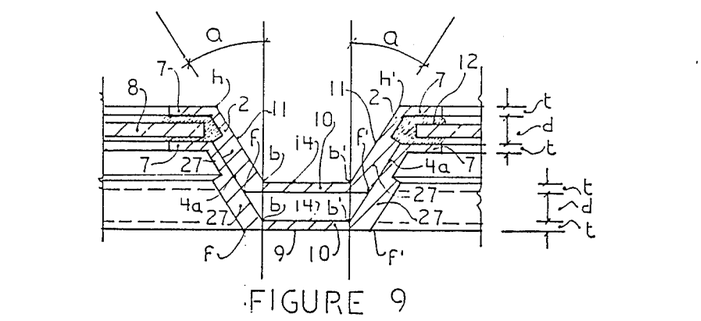
FIG. 9: Shows a section through frame elements of a matrix having variable thickness t forming spacing bars between frames.
Figure 10:
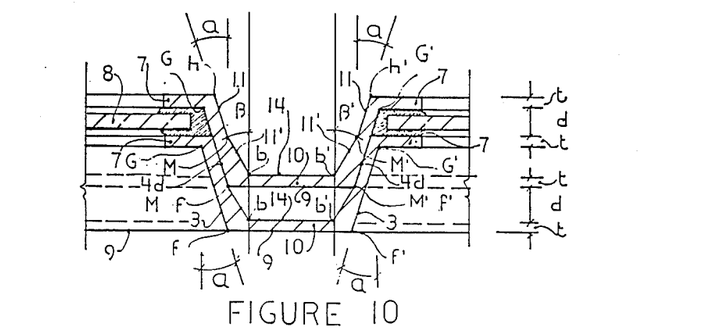
FIG. 10: Shows a section through frame elements of a matrix having a compound angle forming the webs of the frame elements.
Figure 11:
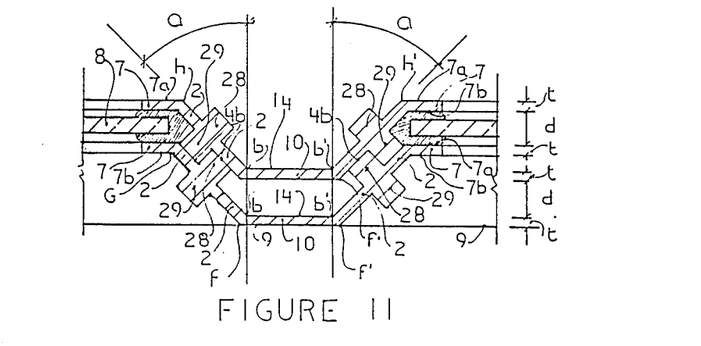
FIG. 11: Shows a section through frame elements of a matrix having projections on either side of the webs of the frame elements giving a locking structural section.

The angle can vary in inclination to offer (d) or (t) as required. The steeper angles stack sooner than larger angles and offer larger design spaces (d) and greater rigidity to the grid. The larger angles those from 30° to 45° and larger, stack closer together offering less design space (d) and have a lesser structural capacity for long spans as they approach a flat perforated plate. The broader angles over 45° from normal to the flat portion can make perforated plate structures particularly if a projection is added to either side of the two webs as shown in FIG. 9–11 forming desired design space (d).

The fastening devices extend the shortest possible distance between the opposed half-matrices from the one outer stacked frame flat portion to the opposed outer stacked frame flat portion at grid intersections. A high compressive strength thermally non-conductive annular spacer is placed on each fastener at the neutral axis between opposed half-matrices at each grid intersection. The fastening device are then put into tensile stress by threaded rods or other mechanisms exerting a compressive force causing the two stacked frames on either side of the neutral axis to engage firmly at their shared surfaces and to bear upon the compressive annular discs disposed between each stacked frame and the non-conductive disc at the midline which accepts the compressive stress while spacing the matrices apart. By this means structural stresses are transmitted between the opposed half-matrices through the neutral axis, however heat or cool waves cannot pass from the anterior matrix to the posterior matrix or vice versa.

Once fastened together the two identical half-matrices act as a single structural member. In spanning conditions the top frame elements will accept lateral compression and the bottom frame elements will accept tensile stresses and the two opposed identical matrices though structurally joined may each take on entirely different thermal gradients.

The novel profile of the frame elements which form the basic grid consist of two inclined webs (2) extending outwardly from either end of a flat portion (10). The angle of inclination (a) of the webs from normal to the flat portion being critical to the correct stacking results. At the end of each web is a flange (7) parallel to the flat portion. Both webs extend at inclined angles (a) from a line struck normal at the juncture of the flat portion and the inclined web referred to as points b and b'. These two points b and b' are the initial generating points of the stacking principle.

Figure 1:
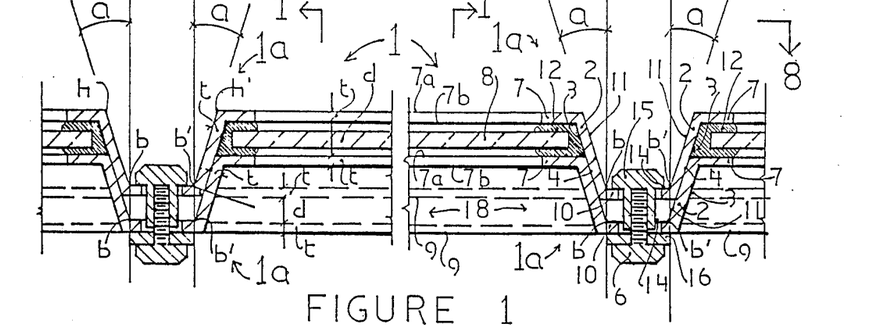
FIG. 1: Shows a staggered section through a half-matrix having
flat glass components.

A line drawn normal to the flat portion at b or b' and dropped down a distance equal to desired (t) thickness of material and (d) depth needed for design requirements at flanges, will give the hypotenuse of a right triangle. Calculate the sine $$\text{alpha} = \frac{t}{d + t}$$

and find the angle alpha (a) and strike that angle from b and b'. Draw a perpendicular to the inclined line at b and b and measure the distance 2t to obtain the doubled structural section and the right triangle having t+d as hypotenuse and t as the side opposite. This is shown in FIG. 1. Thickness t is a constant in this frame profile. Two such frames stacked give the continuous line b'-g' shown in FIG. 1 and shared surface 4.

Expansion and contraction of the opposed half-matrices would occur at different rates according to varying external thermal conditions and would be allowed for at edge conditions where matrix panels share boundaries. In general the outer half-matrix will be in compression due to spanning or wind-loading stresses and under extreme cold subject to shrinkage, both vectors drawing the elements toward the center of the matrix panel. The interior half-matrix undergoing spanning stresses would be in tension and being close to room temperature would be relatively stable dimensionally.

The outer half-matrix in extreme heat would expand undergoing stresses moving in a direction opposed to the compressive vectors due to loading and thus would be more stable in hot than extreme cold external ambient conditions. As doubled shared structural section and could bow if not given latitude at expansion joints. Under cooling conditions the engaged portions should shrink returning to their normal compressive relation which must be water tight at all times.

In general the frame elements seen in elevation from the exterior have recessed portions which intersect and projecting portions holding glass. A half-matrix seen from the interior has projecting portions intersecting and recessed compartments holding the glass components. A whole matrix seen from either side will have recessed frame elements which could hold water and freeze if not properly inclined and mounted to raised seam edges between panels having seams aligned with the pitch of the roof. The matrices will drain properly since all recesses have inclined surfaces which will allow water to seek lower inclinations.

The frame elements forming the inclined webs extending outwardly may be curved or flat, or have variations in thickness or projections on either or both sides of the web (see FIGS. 9-11). But all webs and all flat portions and all flanges must have the same profile and inclinations to stack properly. And all inclinations at corners must have the same angle or a less steep angle as steep angles at corners will prevent frames from engaging their basic stacking angles.

The geometry of the proposed matrices is versatile. In plan view the compartments of the grid may be square, octagonal, hexagonal, circular, rectangular or any other geometry that is suitable for spanning purposes. In section each compartment may also have any desired geometry that is suitable for disposition in mirror-image relation and that has opposed components that are securely restrained by flanges or inclined surfaces.

The inclination of each of the inclined webs may vary from one matrix to the next but all webs in any one stacked matrix configuration must have the same inclination on all stacked surfaces. Care must be taken at corners between inclined webs to retain the same angle of inclination by using a radius of curvature allowing a continuous angle of inclination on all inclined surfaces. If, at a corner, an angle is formed that is more acute than the prevailing stacking angle, the acute angles will engage first preventing the prevailing stacking angles from engaging and causing considerable repair in the mold structure or in the frames having improper corner angles.

If the angle at a corner is more obtuse than the prevailing stacking angle it will not keep the prevailing stacking surfaces from engaging. However there will be an air space between the upper and lower grid at the corners which is undesirable for water tight purposes.

The surfaces of each single basic frame may also be varied to accomplish stacking at a desired depth (d). By varying the thickness of (t) and the angles of the surfaces forming (t) so that t varies and there are two or more angles of inclination on both surfaces 3 and 11 so that shared surface portions 4 have a compound angle, one may obtain any design space (d) without resort to a very steep acute angle. FIGS. 9 through 11 show several techniques for obtaining a relatively deep design space (d) while using angles over 30 and a relatively thin structural section (t).

In the drawings shown an angle of 14°-30' was used to obtain a design space (d) of $\frac{3}{8}$" and a structural thickness (t) of $\frac{1}{8}$".

All angles of inclination are initiated at points b & b' and variation in (t) or surfaces of the flanges must be drawn as originating from b and b' or from h—h' or g—g'. The reference points b—b', h—h', g—g', f—f' will always stack directly over similar numerals so that a single frame may be used to form all compound members.

As in the parent applications, incident sunlight arriving at the outer portions of matrices oriented normal to South will strike the East facing portions of the matrix grid compartments and be reflected toward the conversion panes of the posterior matrix to form an overlapping incidence of energy on the conversion panes. Similarly afternoon sunlight striking West-facing portions of matrix grid compartment will be reflected toward the posterior conversion panes to form an overlapping incidence of energy on the conversion panes at all hours during both morning and afternoon collection cycles. In summer the frame elements shade the conversion panes keeping direct sunlight from striking the absorber and reflecting relatively little light from frame elements toward the absorber due to high sun angles.

When the matrices are used as roofs—summer sun angles will penetrate the matrix and it must be exhausted by convective flow. Absorber panes could overheat in summer conditions if care is not given to the amount of conversion and its location in the matrix. Entirely transparent components may serve best at high points in convective flow for summer purposes The morning collection cycle, wherein East-facing portions of the matrix receive incoming radiation and reflect that radiation toward the absorber panes also benefits from the shadows cast in adjoining chambers which cause a temperature difference between sunlit and shaded portions of each chamber. The temperature difference and the chimney effect of open ended entry and exit to and from the matrices draws air freely through all chambers where the warming air expands and pushes its way through passages between chambers generally flowing from East to West in the morning cycle and West to East in the afternoon cycle when West facing portions of the matrix become sunlit and East facing portions of each are in shadow. This reversal of flow would occur shortly after noon as East-facing portions lose some of their surface temperature to the air stream and due to shading.

In general, equilibrium temperatures on all surfaces of the matrix should be impossible to obtain and thus a general air motion should be accomplished at all times and stagnation of convective flow avoided.

The thermal mass of the matrix as a whole is the entire mass of both half-matrices, frames and components. The volume of fluid medium within the matrix as a whole is the summation of all voids in all compartments and in all passages. The rate of flow through the matrix is a design choice. Since radiant energy arrives in roughly predictable quantities over time on surfaces of varying inclination, the window to radiation or aperture of each compartment relative to the mass dispersed about the periphery of each internal hollow chamber behind the aperture formed by opposed half-compartments, and the volume of fluid contained in the compartment and passing through (e.g. air changes per hour) are all vital factors in the success of the matrix in harvesting incoming radiation. Each compartment is basically a unit volume of the matrix, presenting a specific window to radiation and providing an expansion chamber for air being heated by those peripheral internal surfaces in sunlight and by warm air entering the chamber from adjacent expansion chambers on any side.

The ideal matrix would convert and transport all radiation incident in each unit volume harvesting the energy incident in each chamber. Thus the chamber size, the thickness of the dispersed mass about the periphery, the transparency of the anterior and posterior boundary and use of heat-reflective coatings all play a major role that must be designed for efficacy in each installation and each specific matrix design. The structural mass of the frame elements adds to the thermal mass of the matrix but the thermal break between half-matrices should compensate for too much mass in the system as a whole.

DETAILED DESCRIPTION OF FIGURES

FIG. 1: Shows a staggered section taken through a half-matrix showing frame elements in stacked relation and compressive fastening devices in place at grid intersections. Flat glass component 8 is securely restrained by gasket 12 between opposed flanges 7 of frames 1a and 1a which are stacked to form shared surface 4. Each frame element has outer flanges 7, webs 2, and a flat bottom portion 10. Each web has exposed surface 11 and an opposed surface 3. Each flat portion has exposed surface 14 and opposed surface 9. The female compressive device 15 joins with the male compressive device 6 to fasten the two basic frame units 1a together to form half-matrix 1 having a half -compartment 18. The angle (a) as shown is 14°-30', t is ⅛" and d is ⅜" according to formula $$\sin e\ a = \frac{t}{d + t}.$$

The generating points b and b' occur at either end of the surface 14 of flat portion 10 at the juncture with surfaces 11. All further combinations of frame units and elements have the same reference surfaces, points and numbers.

Figure 1A:
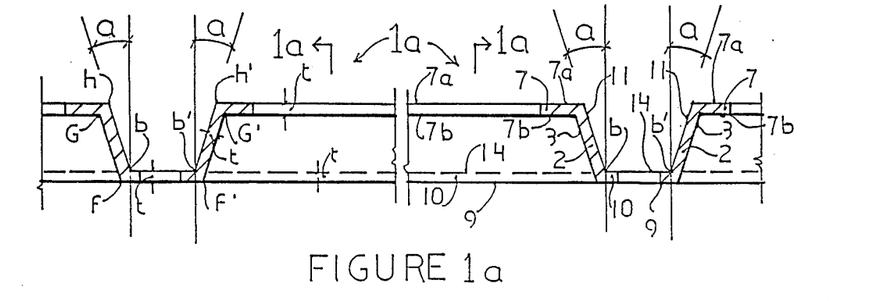
FIG. 1a: Shows a section through the basic frame units having basic frame elements which combine with identical frame units to form the compound matrix and half-matrices.

FIG. 1a: Shows a section through basic frame unit 1a having frame elements consisting of flanges 7 webs 2 each disposed at equal distance and inclination from center line of symmetry of the element at any angle a. Flat portion 10 joins the two webs 2 at b and b'. The webs each have two opposed surfaces 11 and 3 and the flat portion 10 has two opposed surfaces 14 and 9. The flanges have two opposed surfaces 7a and 7b. The generating points b14 b' formed by the juncture of surfaces 14 and 11 are the basic reference points for the stacking principle. Secondary reference points are h-h' formed by juncture of surface 7a and 11. Tertiary reference points are g-g' formed by juncture of surfaces 7b and 3 and reference points f-f' formed by juncture of surfaces 9 and 3. Variation in any of these reference points results in variation of thickness t and design depth d even when the angle of inclination(a)remains constant.

Figure 2:
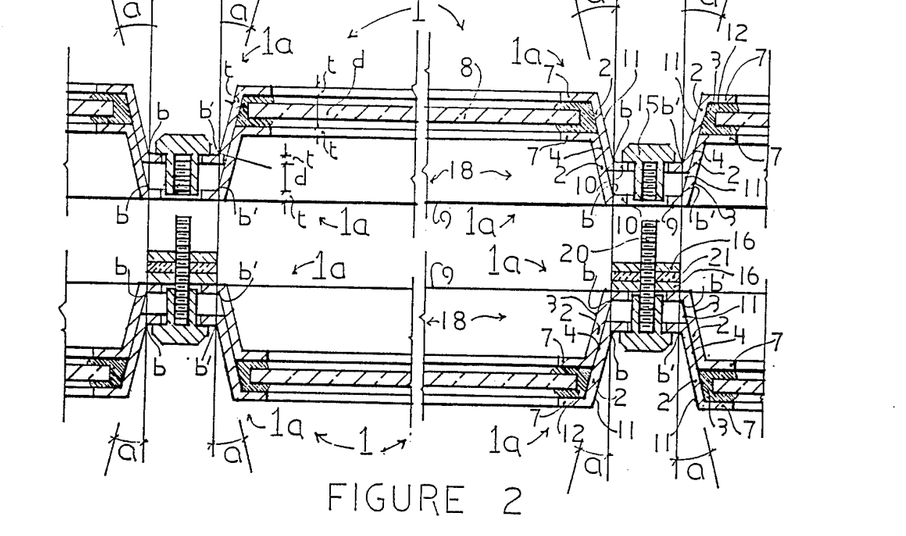
FIG. 2: Shows a section through two half-matrices being assembled to form a whole matrix.

FIG. 2: Shows two half matrices 1 being assembled with compressive housing devices 15 and threaded bolt 20, and compressive threaded washers 16 and thermal non-conductor 21 being put in place.

Figure 3:
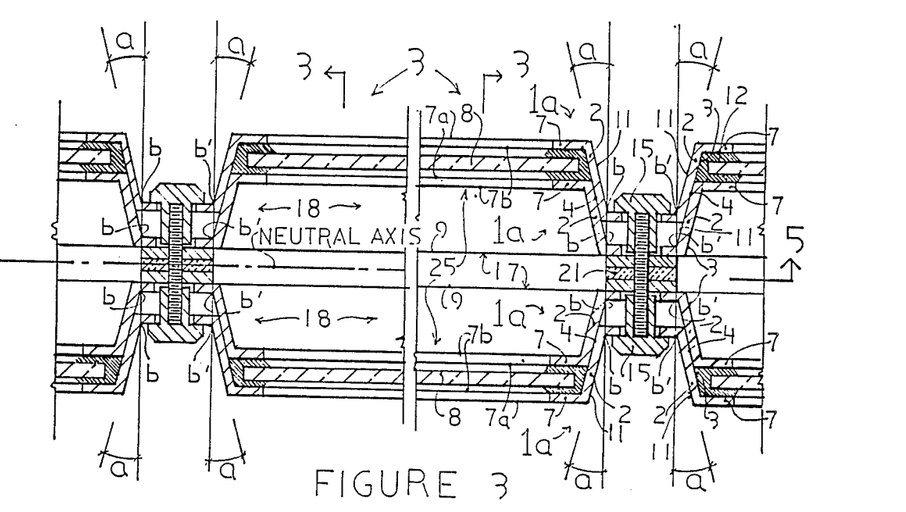
FIG. 3: Shows a staggered section through a whole matrix after
assembly and having thermal break devices in place
Figure 5:
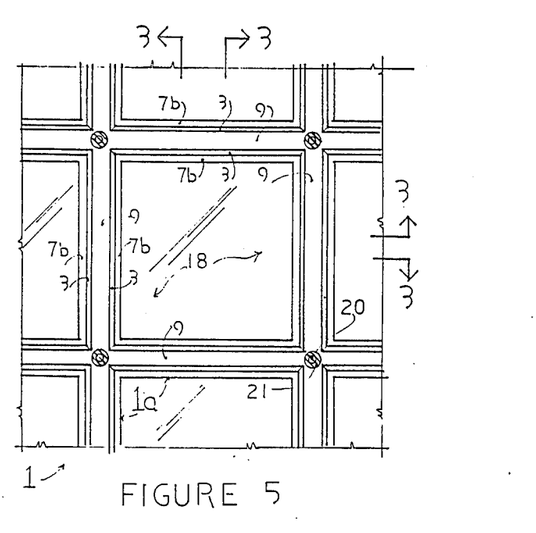
FIG. 5: Shows a planar section through the matrix taken at the neutral axis and parallel to the plane of flow.

FIG. 3: Shows a staggered section through a whole matrix after assembly at a grid intersection and through frame elements. Two opposed matrices 1a are in place in mirror image relation at equal distance from the neutral axis having thermal non-conductor 21 providing a thermal barrier between compressive washers 16. The matrix shown here has frame elements intersecting to form a square compartment as shown in FIG. 5. FIG. 3 is a section taken through FIG. 5. Hollow internal chamber 25 passages 17 are formed.

Figure 3A:
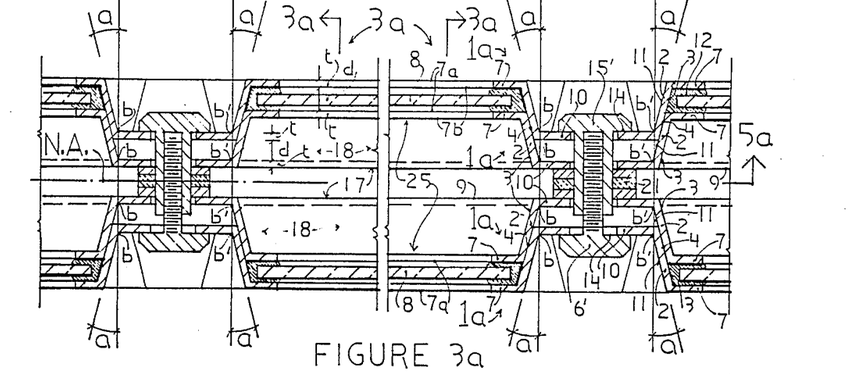
FIG. 3a: Shows a section through a grid intersection in a matrix having the intersection between frame elements form an octagonal recess.

FIG. 3a: Shows a section taken through grid intersection of a matrix having frame elements intersecting at right angles but having the corners at intersections removed to form a larger bearing area and having an octagonal recess formed as shown in FIG. 5a.

Figure 4:
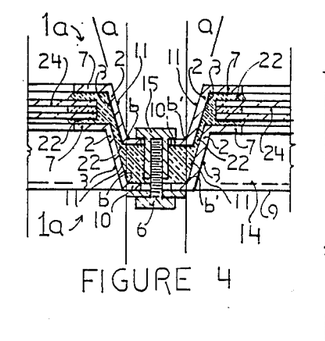
FIG. 4: Shows a section through a half-matrix having a thermal barrier between two basic frame units.

FIG. 4: Shows a section through a half-matrix 1 having a thermal non -conductor compressive gasket 22 disposed between frames 1a and 1a. A whole matrix may be formed from this half-matrix. A double paned transparent component 24 is restrained between flanges 7.

FIG. 5: Shows a planar section through a whole matrix taken at the neutral axis and parallel to the neutral axis showing thermal non-conductor 21 and bolt 20 and half-compartment 18. This matrix has same frame elements as basic frame units 1a and 1a intersect at right angles to form a four way recess having right angle corners. Surfaces 9, 7b and 3 of the frame elements are visible as is flat glass 8.

Figure 5A:
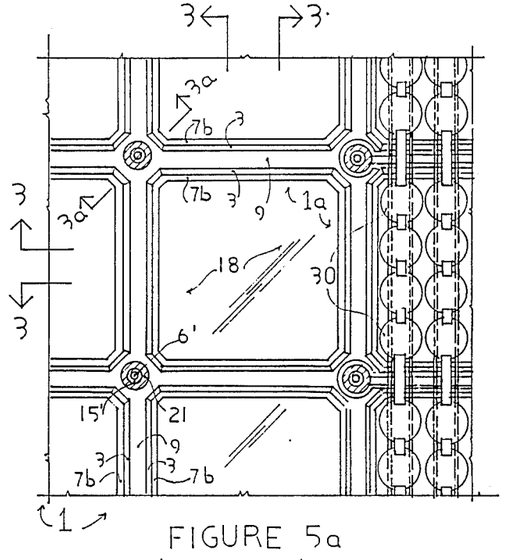
FIG. 5a: Shows an planar section at the neutral axis of a matrix having the intersection between frame elements form an octagonal recess.

FIG. 5a: Shows an elevation of a matrix having the intersection between frame elements meet at right angles but the corners are removed to form an octagonal recess at the grid intersections. FIG. 3a shows a section through this octagonal recess.

Figure 6:
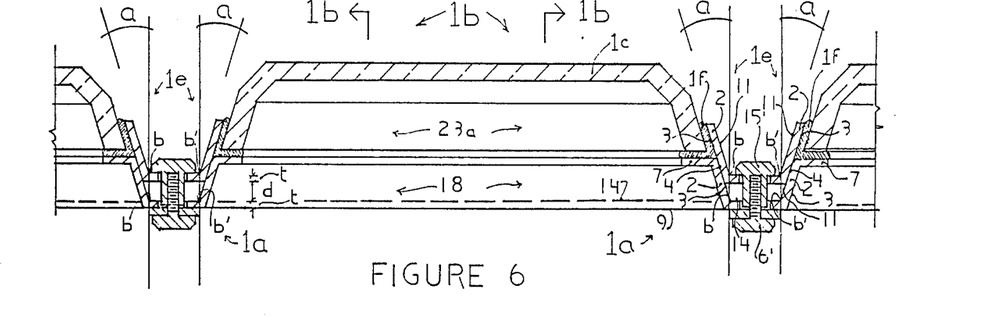
FIG. 6: Shows a section through a half-matrix having glass half-blocks as transparent components.

FIG. 6: Shows a section through a half-matrix 1b having half-blocks 1c as transparent components. The angle of inclination of half -block 1c external surface matches inclination of angle (a) and faceted outer surfaces of 1c provide less acute external angles and refraction of light for appearance and collection purposes. Stacked frames 1e and 1d have same elements and surfaces as the basic unit frames but flanges on frame (d) only.

Figure 7:
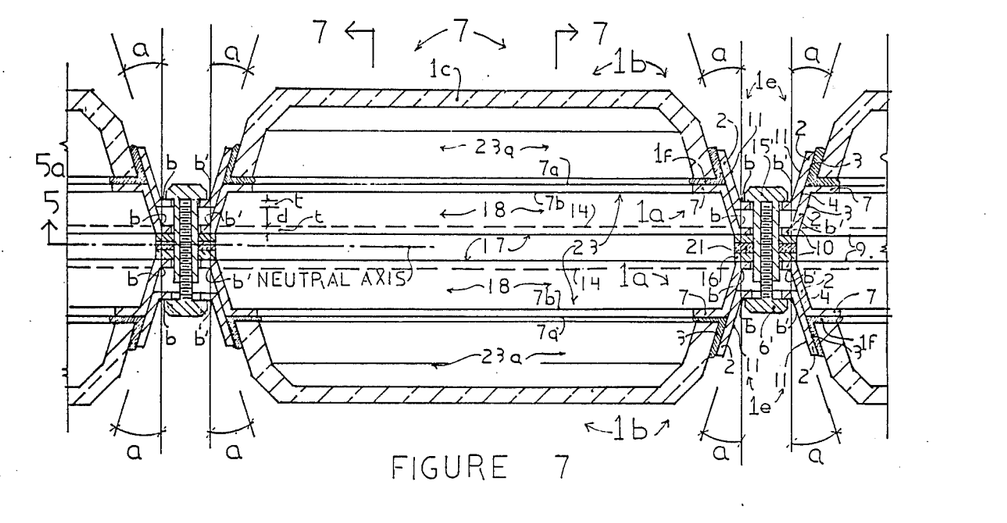
FIG. 7: Shows a section through a matrix having paired and opposed glass half-blocks as transparent components.

FIG. 7: Shows a section through two joined half-matrices 1b arranged in paired and opposed relation and fastened in a similar manner as matrices 1 and 1 to form a whole matrix 7 having internal chambers 23 and frame units 1d and 1e stacked to restrain half-block component 1c, having gasket 1f extend around each compartment 23a.

Figure 8:
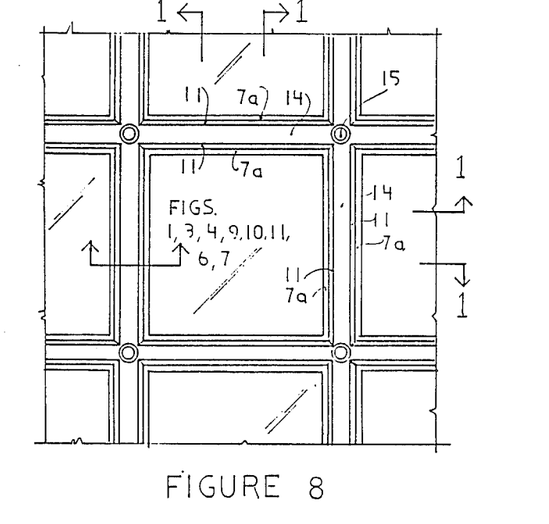
FIG. 8: Shows an elevation of the half-matrix shown in FIG. 1.

FIG. 8: Shows an elevation of the half-matrix of FIG. 1. Seen from the exterior and interior as both views are identical.

FIG. 9: Shows a section through typical frame elements stacked having an angle (a) and a variable thickness (t) which forms spacing bars 27 giving a large depth (d) without using an acute steep angle of inclination (a) and forming shared surface 4a.

FIG. 10: Shows a section through frame elements of a matrix having a compound angles a and b forming the surface 11 and 11' and surface 3 of web 2 to a shared surface 4d. Points M & M' are the site of the change in surface angle between 11 & 11'.

FIG. 11: Shows a section through frame elements of a matrix having projections 28 and 29 on either side of the webs 2 to form a locking shared surface 4b when webs are stacked.

I claim:

1. A compound planar matrix providing solar collector roofs and walls comprising a chambered grid member having an anterior half-matrix forming the first external surface and first internal surface of said compound matrix with respect to incoming radiation, and an opposed posterior half-matrix arranged in mirror-image relation and forming the last internal surface and last external surface of said compound matrix with respect to incoming radiation, said anterior half-matrix and said posterior half-matrix each consisting of two identical frame members arranged in stacked relation, each said frame member having identical frame elements arranged in intersecting relation to form grid intersections defining grid compartments surrounded by said intersecting frame elements, each said identical frame element consisting of a flat portion having inclined webs extending outwardly away from the opposing ends of the flat portion and each inclined web having a second flat portion forming a flange parallel to the first said flat portion and extending further outwardly and all inclined webs having the same angle of inclination, the two said identical frame members of each said half-matrix being stacked having said inclined portions of each frame element engage to thereby restrain apart the said flanges, and forming a fixed space between the said stacked flanges extending about the periphery of each said grid compartment, each said grid compartment having a non-opaque planar body placed therein having its peripheral edges restrained and cushioned in the said fixed space formed by the said stacked flanges, the said anterior and posterior half-matrices being arranged in paired and opposed mirror-image relation to form the said compound matrix having a neutral plane of symmetry and having said flanges form parts of the said opposed external surfaces of said compound matrix and said flat portions fastened to each other at said grid intersections by compressive devices having a thermal non-conductor spacing device disposed between each opposed grid intersection to space apart the opposed half-matrices and forming a thermal barrier between the opposed half-matrices at the said neutral plane of symmetry, said opposed grid compartments forming cooperatively a plurality of internal hollow chambers having passages between chambers provided by said spacing devices, said passages intersecting in each chamber and extending the full length and breadth of the said compound matrix and through its terminal portions and means for entry and exit of air as a medium of heat transfer.

2. The compound planar matrix of claim 1 wherein the said non-opaque planar bodies of said posterior half-matrix consist of translucent panes of glass having translucent conversion means, said translucent conversion means consisting of metallic particles suspended in the structural material of fabrication and the said non-opaque planar bodies of said anterior half-matrix consist of transparent panes of glass.

3. The compound planar matrix of claim 2 wherein the said translucent panes of said posterior half-matrix having said translucent conversion means alternate in any lateral succession with entirely transparent panes of glass for temperature modification of the convective medium of heat exchange.

4. The compound planar matrix of claim 2 wherein the said translucent conversion means consists of a deposition of metallic particles on one of the said last surfaces of said compound matrix.

5. The compound planar matrix of claim 1 wherein one of the said first and last internal surfaces of said opposed anterior and posterior half-matrices are coated with a heat-reflecting light-transmitting metallic oxide.

6. The compound planar matrix of claim 1 wherein all said inclined webs of all said frame elements have a compound angle of inclination consisting of two or more angles and all said inclined webs have the same compound angles of inclination.

7. The compound planar matrix of claim 1 wherein all said inclined webs of all said frame elements have a variation in thickness consisting of an increase in thickness at selected portions and all said inclined webs have the same variation in all their parts to thereby adjust the depth of the said fixed space extending about the periphery of each said grid compartment.

8. A compound planar construction matrix comprising an anterior half-matrix disposed to form the first radiation receiving surfaces of said compound matrix and a posterior half-matrix disposed in mirror-image relation to form the last radiation receiving surfaces of said compound matrix, each of the said half-matrices consisting of two frame members arranged in stacked relation and each frame member having inclined frame elements disposed in intersecting relation to form a grid, having grid intersections forming a plurality of compartments, each compartment having a transparent component restrained therein by said inclined frame elements, said identical half-matrices are arranged in paired and opposed mirror-image relation to form a neutral plane of symmetry of said compound matrix and having said compartments cooperate to form a plurality of internal hollow chambers, the said two opposed half-matrices being joined together by compressive devices at said grid intersections having thermal non-conductor spacers located at each grid intersection at the said neutral plane of the compound matrix spacing the opposed half-matrices apart and forming a series of continuous passages extending the full length and breadth of said compound matrix and intersecting in each said internal chamber, wherein the joined half-matrices form a single structural member having two thermal gradients, an external gradient in the anterior half-matrix and an internal gradient in the posterior half-matrix.

9. The compound planar construction matrix of claim 8 wherein each of the said transparent components consist of a hollow glass half-block having inclined surfaces disposed about an outer periphery of the block and in abutting engagement with the inclined surfaces of the said frame elements of each said half-matrix.

10. The compound planar construction matrix of each of the said half-matrices consist of two stacked frame members having said inclined frame elements, each inclined frame element sharing a portion of its surface area with the adjacent inclined frame element to form cooperatively a doubled structural section extending about the periphery of each said grid compartment.

11. The compound planar matrix of claim 8 having photovoltaic devices disposed in said internal hollow chambers for conversion of incident solar radiation to electricity and the structural material of fabrication of said compound matrix consists of a thermal and electrical non-conductor substance.

* * * * *